No. 826,461. PATENTED JULY 17, 1906.
C. E. W. WOODWARD.
VEHICLE TIRE.
APPLICATION FILED JUNE 29, 1905.

2 SHEETS—SHEET 1.

Witnesses:
H. L. Sprague
E. L. Smith

Inventor.
Charles E. W. Woodward
by Chapin & Co
Attorneys.

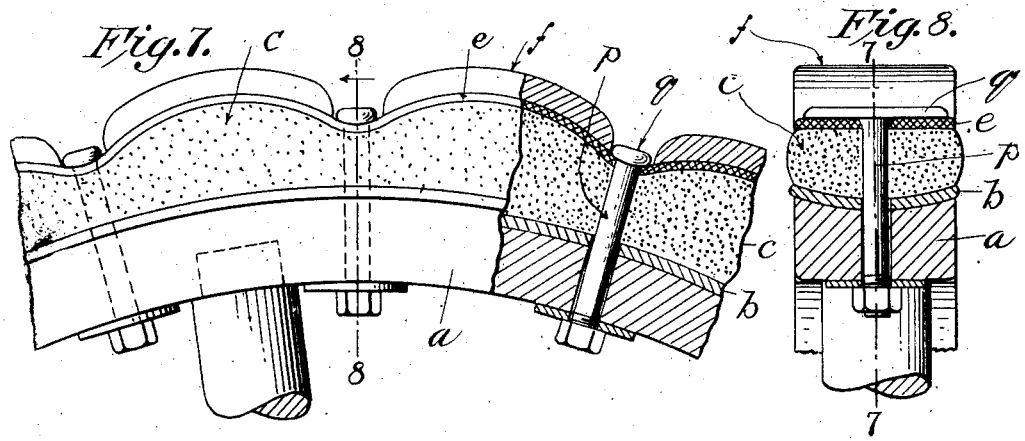
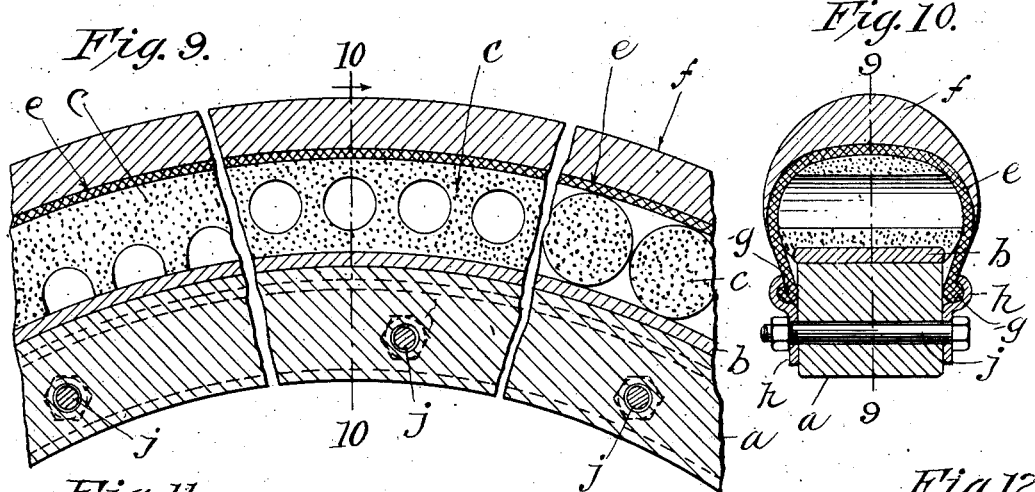
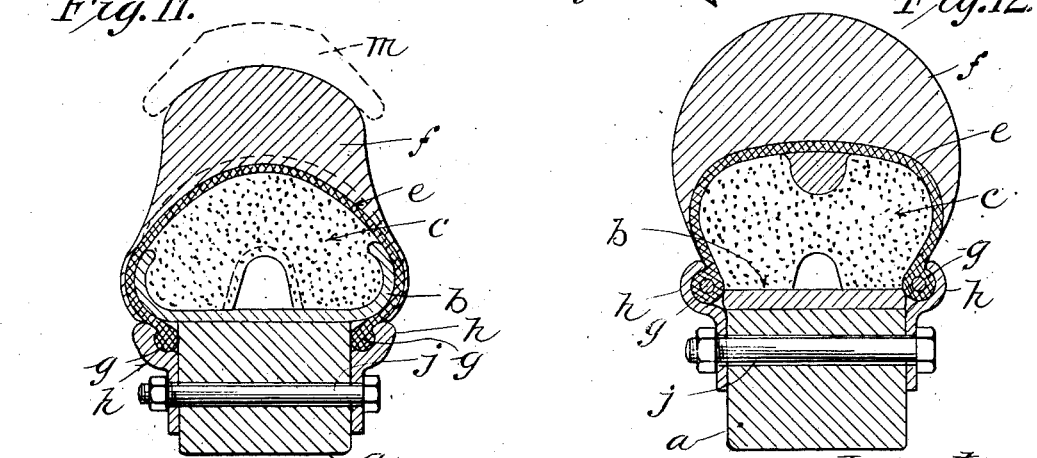

UNITED STATES PATENT OFFICE.

CHARLES E. W. WOODWARD, OF CHICOPEE FALLS, MASSACHUSETTS, ASSIGNOR OF ONE-HALF TO KNOX AUTOMOBILE COMPANY, OF SPRINGFIELD, MASSACHUSETTS, A CORPORATION, AND ONE-HALF TO OLDS MOTOR WORKS, OF DETROIT MICHIGAN, A CORPORATION.

VEHICLE-TIRE.

No. 826,461.   Specification of Letters Patent.   Patented July 17, 1906.

Application filed June 29, 1905. Serial No. 267,547.

*To all whom it may concern:*

Be it known that I, CHARLES E. W. WOODWARD, a citizen of the United States of America, residing at Chicopee Falls, in the county of Hampden and State of Massachusetts, have invented new and useful Improvements in Tire Construction, of which the following is a specification.

This invention relates to tires for vehicles, the object thereof being to produce an improved so-called "solid" tire as distinguished from the pneumatic, in which an elastic or resilient core is provided, which is held under compression by an inclosing casing of flexible but practically non-elastic material, to the end that in the completed construction there may be no creeping of the casing relative to the core and to the end that said constricting-casing may be subjected to a distending pressure due to the reaction of the constricted core, through which constriction the same distending effect is produced on the casing as by the inflation of a pneumatic tire, but differing from the latter in that the condensed core offers a much greater resistance to further compression, owing to the density of the material, than does a pneumatic tire even when the latter is under relatively high pressure.

The core may be made of pure or relatively pure rubber, which in itself is practically non-compressible, but in which the expansive action referred to may be obtained by a constriction which will result in the change of its normal cross-sectional form, or the core may be provided with cavities or channels molded therein, which will permit the practical compression of the core to a degree which equals substantially the cubic contents of said cavity or channel, or the core may be made of sponge-rubber, which is compressible in all directions owing to the distribution through the mass of a large number of minute cells or cavities. Preferably, however, the core consists of a relatively pure body of rubber, annular in form, to encircle the rim of the wheel and compressible mainly in the plane of the wheel, said core being held under compression by the application of a flexible but substantially non-elastic casing secured to the wheel by any of the well-known mechanical devices used for that purpose.

The invention is fully illustrated in the accompanying drawings, in which—

Figure 1:
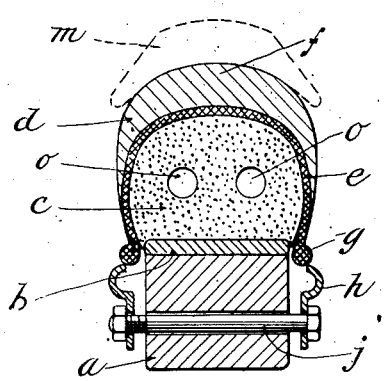
Figure 2:
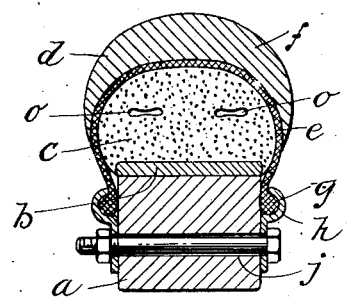
Figure 3:
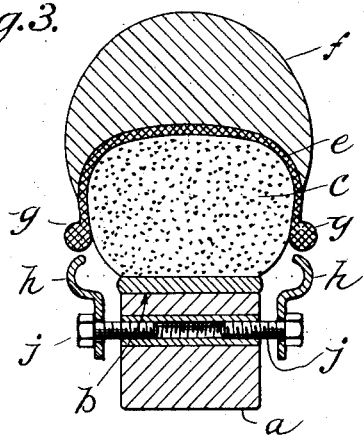
Figure 4:
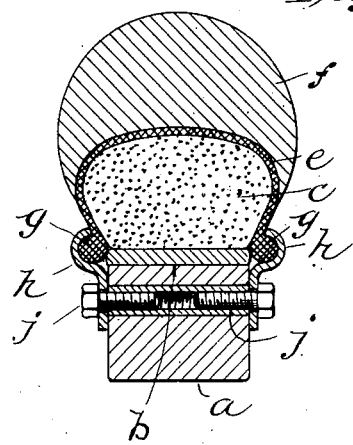
Figure 5:
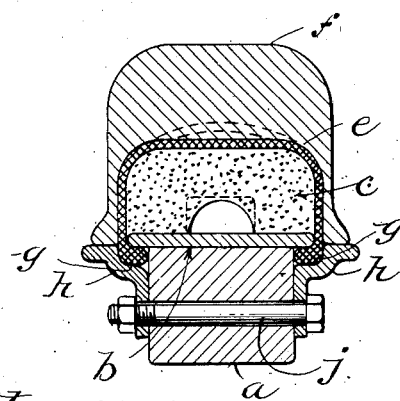
Figure 6:
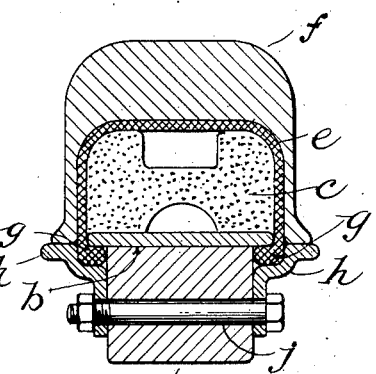

Figure 1 represents a tire in cross-section the core of which is in its natural condition or state of rest, the casing being shown disengaged from its fastening devices. Fig. 2 is a similar view of the tire, showing the core held in a state of compression by the casing, this figure and Fig. 1 showing that type of core which is provided with circumferentially-disposed channels. Figs. 3 and 4 are sectional views like the preceding figures, but showing a core both in the natural and in the compressed state not provided with channels. Fig. 5 is a cross-sectional view of a tire construction in which the core is shown in a compressed condition and provided with a circumferential channel located in the base of the core next the rim. The natural contour of the core in this view is shown in dotted lines, as well as the natural form of the channel. This view also shows a slight variation in the construction of the fastening devices. Fig. 6 is a cross-sectional view of a tire like that shown in Fig. 5, except that the core is provided with two channels circumferentially disposed therein, one on the outer and the other on the inner surface of the core. Fig. 7 is a side elevation, partly in section, of a portion of a wheel having the tire thereon whose construction embodies certain modifications in that the core is held under constriction by means of a circumferentially-disposed band which at regular intervals is drawn toward the rim by a bolt, the core being thus compressed by sections. Fig. 8 is a cross-sectional view on line 8 8, Fig. 7, and shows the manner of effecting the compression of the core at regular intervals. Fig. 9 is a sectional elevation in the plane of the wheel, showing portions of the rim of the latter and three different types of core, two of them being provided with transverse cells and the third, at the right-hand end of the figure, showing a tire with a core made of transversely-disposed cylinders. Fig. 10 is a transverse section through Fig. 9 on line 10 10, the section running through one of the cells disposed transversely of the core. Fig.

11 is a sectional elevation of a tire, showing the core under compression and embodying another well-known means of securing the casing to the wheel, the dotted lines on the drawing showing the degree of distention of the core and of the circumferential channel in the base of the core when the latter is not under constrictive pressure. Fig. 12 shows a construction not unlike that illustrated in Fig. 4 with the exception that an inwardly-extending rib is made on the casing to fit into a groove on the upper side of the core to prevent lateral displacement between the core and the casing, the core being also provided with the circumferentially-disposed channel in its base.

The numerous drawings accompanying this application are for the purpose merely of showing the various ways in which the invention may be carried out in practice; but they all embody the central idea which constitutes the essential feature of the invention—viz., the provision of a resilient or elastic core normally of too great a bulk to be inclosed by the casing, but compressed to such point either in the plane of the wheel or transversely thereto as will permit the casing to be applied thereto, whereby the core may be held under compression by the casing in a manner to effect the outward distention of the casing in the same manner that the inflation of a pneumatic tire would effect its distention, the range of action of the core, however, being limited by the degree of its compression. It should be stated here that the word "compression" is used to denote actual compression of a cellular core or the constrictive pressure applied in one direction to a solid elastic core.

Referring to the drawings, like letters in the various figures indicate like parts, and $a$ is the felly of a wheel; $b$, the rim; $c$, the core, and $d$ indicates the casing as an entirety, which, as a matter of fact, is made, preferably, with an inner portion $e$, of fabric in a number of thicknesses vulcanized together, whereby the elasticity of the casing is practically eliminated, and having the usual tread portion $f$ vulcanized thereon. The casing is also provided with the usual beaded borders $g$, whereby by means of the clamping devices $h$, channeled to receive or overlap these borders, and suitable bolts, as $j$, the casing may be clamped to the rim when the core $c$ has by some mechanical means been compressed to the desired degree, the reference-letter $m$ indicating the sectional form of a suitable shoe to fit the tread portion of the casing after the latter has been placed loosely over the core in its distended position, as shown in Fig. 1, the compression of the core, as indicated in Fig. 2, bringing the beaded edges of the casing into position to be engaged by the clamping devices described. Any suitable mechanical means may be employed to move the shoes $m$ to effect this constriction. The preferred construction in carrying out the invention is that which embodies a core of substantially pure rubber having channels $o$ therein, which will permit the core to be compressed centripetally, whereby when it has been released from the constrictive pressure effected by the shoes $m$ its expansive effect will be exerted on the casing in all directions more or less, but more particularly outwardly in the plane of the wheel. It is entirely immaterial, however, whether these channels $o$ be located entirely within the body of the core, as shown in Figs. 1 and 2, or in the base or the outer surface of the core, or both, or whether they extend circumferentially of the core or transversely thereof, or whether they be in the form of grooves or channels or individual cells. These are but individual expressions of the same idea, Fig. 7 being practically the only modification of the construction. In this figure the core is not inclosed on all sides from one edge of the rim $b$ to the other; but a tread portion only is provided, which consists practically of the inner portion $e$, of fabric in the shape of an endless band and wide enough to extend entirely across the tread portion of the tire, there being vulcanized onto this band the rubber treads $f$ in sections, and between the contiguous ends of these treads $f$ the bolts $p$ extend through the felly and the rim and the tire construction, the T-shaped head $q$ of the bolt extending nearly from side to side of the tire, to the end that when the head $q$ of the bolt is drawn toward the rim the fabric part $e$ of the casing will be drawn against the compressible core $c$ evenly from side to side, and as these bolts are tightened successively around the wheel the core assumes the circumferentially-crowning outline between the bolts, (shown in Fig. 7,) the tread portions $f$ of the tire extending only over these crowning parts of the core, as stated.

It will be noted that in this construction the mechanical means to effect the compression of the core form part of the fastening devices whereby the tire is held on the rim, and therefore the compression may be varied, if desired. Furthermore, the casing not being carried over the sides of the core the rim is cupped slightly, as shown, whereby the lateral displacement of the tire is prevented.

In a tire constructed as herein described I am enabled to attain a more lively tire than so far as I know is possible with the solid tires as at present constructed, and, furthermore, am enabled to remove the casings for repairs or renewal, while the active part of the tire—the core—(which is likewise the most expensive part) is protected from wear by the casing. Further, by changing the material or the mode of constructing the core I am enabled to provide a core having a greater or less resistance to compression and can thus adapt the tire to the load it is to carry; and by reason of the reaction of the compressed core there can be no creeping of the casing relative to the latter, and the core and casing are thus protected from the destructive effects of the slightest friction at this point. This point is essential to the commercial success of the construction and, so far as I am informed, is novel in tires other than pneumatic and has been one of the chief causes of expense in the manufacture of solid tires, in that it has heretofore been necessary to secure the casing and core together by cement or vulcanization to prevent the attrition due to creeping and because of this hereto unavoidable union of these two parts the whole tire becomes useless after the wearing away of about twenty-five per cent. thereof, which constitutes the casing, whereas by my invention the core, which is the life of the tire, may be used almost indefinitely, the casings being renewed as required.

Having thus described my invention, what I claim, and desire to secure by Letters Patent of the United States, is—

The combination with a wheel-rim, of a tire comprising an elastic core and a casing therefor, the circumference of the core from one side of the rim to the other being greater than the internal circumference of the casing from one border to the other and arranged to be temporarily constricted, by centripetal pressure extraneously applied before fastening the casing, to effect a lateral bulging of the core, and fastening devices carried upon the wheel-rim and arranged to secure the casing ends in such a manner as to compress the expanded core laterally whereby the core will exert an outward pressure against the casing when the temporary centripetal pressure is removed.

CHARLES E. W. WOODWARD.

Witnesses:
WM. H. CHAPIN,
K. I. CLEMONS.